Nov. 13, 1934.  S. REISS  1,980,826

EAR CLEANING IMPLEMENT

Filed May 3, 1933

INVENTOR
SYDNEY REISS
BY
ATTORNEY

Patented Nov. 13, 1934

1,980,826

UNITED STATES PATENT OFFICE 1,980,826

EAR CLEANING IMPLEMENT

Sydney Reiss, New York, N. Y.

Application May 3, 1933, Serial No. 669,155

10 Claims. (Cl. 128—304)

This invention relates to new and useful improvements in ear cleaning implements.

The invention has for an object the construction of an ear cleaning implement which is characterized by a handle supporting a soft rubber or the like guard above which immediately projects a cleaning element constructed of rubber for use in washing and cleaning the wax or other ingredients from the ear and adapted to be replaceable with cloth material such as felt and the like for the purpose of drying the clean ear.

The invention has for another object the construction of an ear cleaning implement which is characterized by a soft rubber guard or the like adjustable upon a handle in a manner so that a portion of the handle projects from one side of the guard, and the arrangement of a cleaning element mounted upon the projecting portion of the handle.

Still further the invention proposes an arrangement whereby the cleaning element may be adjusted as to length to better fit the ear.

Another one of the objects of this invention is the provision of an adjustable peg upon the cleaning element adapted to be replaced and covered with cleaning material such as rubber or cloth so that the cleaning portion of the implement may be varied to suit various conditions under which it is intended to be used.

Still further the invention has for an object the construction of an implement as mentioned which is simple and durable and which may be manufactured and sold at a reasonable cost.

For further comprehension of the invention, and of the objects and advantages thereof, reference will be had to the following description and accompanying drawing, and to the appended claims in which the various novel features of the invention are more particularly set forth.

The ear cleaning implement according to this invention comprises a handle 25 upon which a soft rubber or the like guard 26 is slidably mounted by reason of having a central opening engaging upon the handle. A cleaning element 27 of cup shape is engaged upon the extended end of the handle 25. This cleaning element may be constructed of rubber, or rubber sponge for use in cleaning the ear. A substitute cleaning element of absorbent material such as felt, cloth, etc., and of the same size and shape may also be provided for drying the ear when substituted for the rubber cleaning element.

Figure 1:
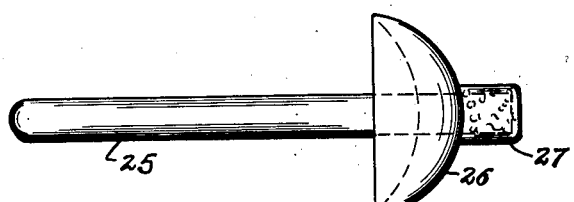
Fig. 1 is a side elevational view of an ear cleaning implement according to this invention.
Figure 2:
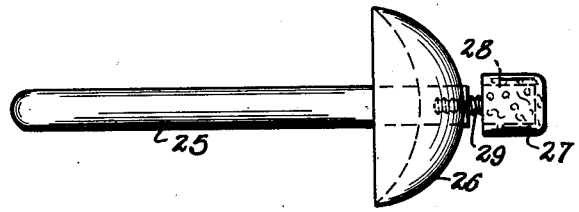
Fig. 2 is a side elevational view of another ear cleaning implement according to a modification of the invention.

In Fig. 2 a modified form of the invention has been disclosed in which the ear cleaning implement comprises a handle 25 upon one end of which there is mounted a soft rubber of the like guard 26. A peg 28 is formed with a stud portion 29 threadedly engaging into the end of the handle 25. A cleaning element 27 is engaged upon the stud. The arrangement allows the stud to be adjusted so that the cleaning element 27 extends at predetermined distances from the guard. In the form of the invention illustrated in Fig. 1 the guard may be slipped along the handle to vary the distance from the cleaning element.

The ear cleaning implement according to another embodiment of this invention comprises a handle 10 upon one end of which there is a soft rubber guard 11 outside of which a cleaning element 12 is located. Preferably the handle 10 should be of ivory and the cleaning element 12 of rubber or sponge or cloth depending upon the operation and service to which the implement is applied.

The soft rubber guard 11 is provided with a tubular base 13 fixedly connected thereon, which base clamps upon the handle to permanently attach the guard in place. The guard is provided with a removable head piece 14. A pair of headed studs 15 project from the head piece 14 and are adapted to engage in a pair of bayonet slots 16 formed in the stationary portion of the guard to accomplish connection and disconnection of the parts. The pegs 15 are fixed upon a clamp disc 17 which is permanently attached on the under side of the head piece 14.

A peg 18 is formed with a threaded stem 19 which threadedly engages into the end of the handle upon which the rubber guard is mounted. Cleaning material such as a rubber sheet 20 covers the peg 18 and has its edges clamped between the clamping disc 17 and the stationary portion of the guard 11. The cleaning material is shown with a roughened face as for example with a plurality of small projections so that it may be efficiently used in washing or cleaning the ear in removing the wax.

The peg 18 is formed with a roughened face indicated in Fig. 2 so that the inner side of the cleaning element 20 serves to frictionally hold it in adjustable position. The peg may be adjusted by loosening and removing the cleaning material first. The extension of the peg is useful in adjusting the implement to suit the ears of different persons.

Figure 6:
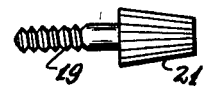
Fig. 6 is a side elevational view of a modified form of the peg for use in the implement.

In Fig. 6 a modified form of peg for the cleaning implement has been shown which is provided with a head portion 21 of frusto conical form. This head portion is also shown with a roughened surface for the same reason as before stated relative to the peg 18.

Figure 7:
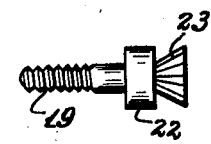
Fig. 7 illustrates a still further modified peg.
Figure 3:
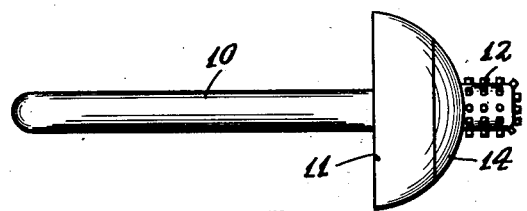
Fig. 3 is a side elevational view of an ear cleaning implement according to another embodiment of the invention.

In Fig. 7 another form of peg has been disclosed which is provided with a head member consisting of a cylindrical base 22 and an inverted frusto-conical head 23.

Figure 8:
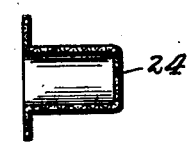
Fig. 8 is a longitudinal sectional view of cloth material to replace the rubber cleaning element shown in Fig. 2.
Figure 4:
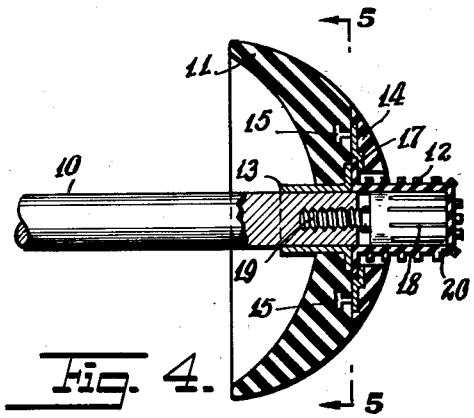
Fig. 4 is a longitudinal sectional view of the implement shown in Fig. 3.
Figure 5:
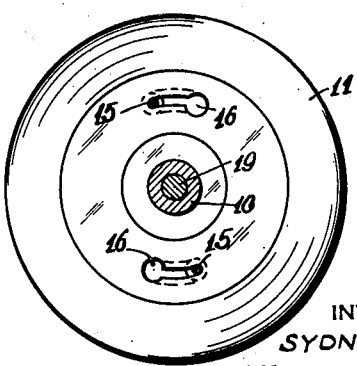
Fig. 5 is a transverse sectional view taken on the line 5—5 of Fig. 4.

In Fig. 8 a cloth felt or the like covering material 24 has been illustrated for covering the peg of the cleaning implement.

In use the implement should be held by the handle and the cleaning end thereon inserted into the ear. The guard 11 strikes against the ear and prevents the implement from being inserted too far which is liable to cause injury. The wax and other ingredients in the ear may be successfully cleaned and washed with the cleaning element 20. The ear may next be dried by removing the cleaning element 20 and substituting the cleaning element 24 which is of cloth or other absorbent material.

The head piece may be moved so as to move the headed studs 15 from the bases of the bayonet slot 16 to positions in which the head piece 14 may be lifted from the fixed portion of the guard. This releases the cleaning element 20 and allows the substitution just mentioned.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. An ear cleaning implement, comprising a handle, a soft guard fixed on one end of said handle, and a cleaning element mounted upon said handle immediately above the center of said guard, a peg being adjustably mounted on the end of said handle immediately adjacent said guard, and said cleaning element comprising covering material engaged over said peg.

2. An ear cleaning implement, comprising a handle, a guard fixed on one end of said handle, and having a removable head piece, a peg adjustable on the said end of said handle, and covering material over said peg and having its edges clamped under the head piece of said guard.

3. An ear cleaning implement, comprising a handle, a guard fixed on one end of said handle, and having a removable head piece, a peg adjustable on the said end of said handle, and covering material over said peg and having its edges clamped under the head piece of said guard, said peg being threadedly engaged into the end of said handle.

4. An ear cleaning implement, comprising a handle, a guard fixed on one end of said handle, and having a removable head piece, a peg adjustable on the said end of said handle, and covering material over said peg and having its edges clamped under the head piece of said guard, said peg being threadedly engaged into the end of said handle, and said covering material frictionally engaging the peg to hold it in adjustable positions.

5. An ear cleaning implement, comprising a handle, a guard fixed on one end of said handle, and having a removable head piece, a peg adjustable on the said end of said handle, and covering material over said peg and having its edges clamped under the head piece of said guard, comprising rubber material with a roughened outside.

6. An ear cleaning implement, comprising a handle, a guard fixed on one end of said handle, and having a removable head piece, a peg adjustable on the said end of said handle, and covering material over said peg and having its edges clamped under the head piece of said guard, comprising cloth material.

7. An ear cleaning implement, comprising a handle, a guard fixed on one end of said handle, and having a removable head piece, a peg adjustable on the said end of said handle, and covering material over said peg and having its edges clamped under the head piece of said guard, headed studs projecting from the head piece of said guard engaging in bayonet slots in the fixed portion of the guard to accomplish the removability of said head piece.

8. An ear cleaning implement, comprising a handle, a guard fixed on one end of said handle, and having a removable head piece, a peg adjustable on the said end of said handle, and covering material over said peg and having its edges clamped under the head piece of said guard, a clamp disc being fixed upon the inner side of said removable head piece and adapted to engage over the edges of said covering material.

9. An ear cleaning implement, comprising a handle, a guard fixed on one end of said handle, and having a removable head piece, a peg adjustable on the said end of said handle, and covering material over said peg and having its edges clamped under the head piece of said guard, a tubular base being fixed upon said guard and engaging said handle to constitute the mounting of the guard upon the handle.

10. An ear cleaning implement, comprising a handle, a guard fixed on one end of said handle, and having a removable head piece, a peg adjustable on the said end of said handle, and covering material over said peg and having its edges clamped under the head piece of said guard, said peg having a roughened outer surface, and said covering material frictionally engaging over roughened surfaces.

SYDNEY REISS.